United States Patent [11] 3,622,579

[72] Inventors Helmut Stahle
Ingelheim, Rhine;
Herbert Koppe, Ingelheim, Rhine; Karl
Zeile, Ingelheim, Rhine; Wolfgang Hoeeke,
Budenheim, Rhine; Hans-Wolfgang
Samtleben, Ingelheim, Rhine, all of
Germany
[21] Appl. No. 854,034
[22] Filed Aug. 28, 1969
[45] Patented Nov. 23, 1971
[73] Assignee Boehringer Ingelheim G.m.b.H
Ingelheim, Rhine, Germany
[32] Priority Oct. 1, 1965
[33] Germany
[31] B 83964
Continuation of application Ser. No.
801,863, Feb. 24, 1969, now abandoned,
which is a continuation of application Ser.
No. 583,424, Sept. 30, 1966, now
abandoned. This application Aug. 28, 1969,
Ser. No. 854,034

[54] DERIVATIVES OF 2-ANILINO-1,3-
DIAZACYCLOPENTENE-(2)
2 Claims, No Drawings
[52] U.S. Cl....................................................... 260/253,
260/309.6, 260/552, 260/553, 260/564, 424/273
[51] Int. Cl....................................................... C07d 49/34
[50] Field of Search............................................ 260/309.6

[56] References Cited
OTHER REFERENCES
Najer et al., Chem. Abst. Vol. 57, Columns 802– 803
(1962) QD1.A51
Netherlands Application 6411516 4–1965 260–309.6 pages
1– 11 relied on Primary Examiner—Natalie Trousof
Attorney—Hammond & Littell ABSTRACT: The compounds are 2-(disubstituted-anilino)-
1,3-diazacyclopentenes-(2) and acid addition salts thereof,
useful as hypotensives in warm-blooded animals.

DERIVATIVES OF 2-ANILINO-1,3-DIAZACYCLOPENTENE-(2)

This is a continuation of copending application Ser. No. 801,863, filed Feb. 24, 1969, now abandoned, which in turn is a continuation-in-part of copending application Ser. No. 583,424, filed Sept. 30, 1966, now abandoned.

This invention relates to novel derivatives of 2-anilino-1,3-diazacyclopentene-(2) and salts thereof, as well as to various methods of preparing these compounds.

More particularly, the present invention relates to a novel class of derivatives of 2-anilino-1,3-diazacyclopentene-(2) of the formula

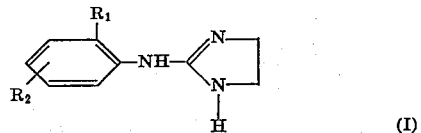
(I)

wherein one of substituents $R_1$ and $R_2$ is methyl or methoxy, and the other is fluorine, chlorine, bromine, trifluoromethyl or cyano; provided, however, that one of $R_1$ and $R_2$ is other than methyl when the other is chlorine. The invention also relates to salts of this class of compounds, especially to nontoxic, pharmacologically acceptable acid addition salts thereof.

The compounds according to the present invention may be prepared by any of the known methods for the preparation of 2-arylamino-1,3-diazacyclopentenes, such as those described in U.S. Pat. Nos. 2,899,426, 3,202,660 and 3,236,857. However, the following methods have proved to be particularly convenient and efficient:

METHOD A

By reacting an isothiouronium salt of the formula

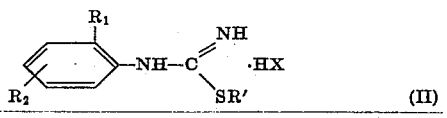
(II)

wherein $R_1$ and $R_2$ have the same meanings as in formula I, R' is lower alkyl, and X is the anion of an acid, preferably the anion of a hydrohalic acid, with ethylenediamine.

The reaction may be carried out with or without an inert solvent. Thus, the reaction may be effected by simply heating a mixture of the reactants to between 100° and 200° C., whereby satisfactory yields of the desired end product are obtained. Alternatively, the reaction may also be carried out at relatively low temperatures (60°–140° C.) in the presence of a suitable inert solvent, preferably one which contains polar groups, such as water or a lower alkanol; however, under these conditions longer reaction periods must be accepted if good yields are to be achieved.

The isothiouronium salt of the formula II may itself be prepared by customary methods, such as by heating a thiourea derivative of the formula III below, obtained from a correspondingly substituted aniline and ammonium thiocyanate (Houben-Weyl, Vol. 9, p. 887), with an alkylating agent, such as a lower alkyl halide or a di-lower alkyl-sulfate.

METHOD B

By reacting an N-phenyl-thiourea compound of the formula

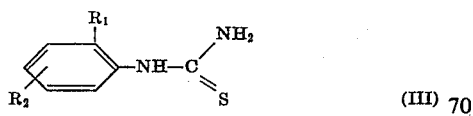
(III)

wherein $R_1$ and $R_2$ have the same meanings as in formula I, with ethylenediamine. The reaction is advantageously performed by heating a mixture of the reactants, preferably in a vacuum, using a stoichiometric excess of ethylenediamine.

The N-phenyl-thiourea compound of the formula III may be obtained from a correspondingly substituted aniline and ammonium thiocyanate, as indicated above.

METHOD C

By subjecting an N-phenyl-N'-(β-amino-ethyl)-urea compound or -thiourea compound of the formula

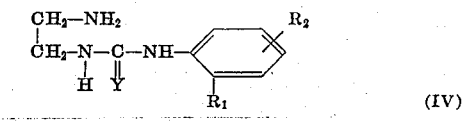
(IV)

wherein $R_1$ and $R_2$ have the same meanings as in formula I and Y is oxygen or sulfur, to pyrolysis to effect ring closure of the diazacyclopentene ring.

A starting compound of the formula IV may itself be obtained by reacting a correspondingly substituted phenyl-isothiocyanate or phenyl-isothiocyanate with ethylenediamine, pursuant to the method described in Journal of Organic Chemistry, Vol. 24, page 818 (1959).

The end products obtained by methods A through C, that is, the compounds embraced by formula I, are organic bases and form nontoxic salts, especially nontoxic, pharmacologically acceptable acid addition salts, with various inorganic or organic acids and synthetic acid resins. Examples of nontoxic, pharmacologically acceptable acid addition salts include, but are not limited to, those formed with hydrochloric acid, hydrobromic acid, phosphoric acid, sulfuric acid, nitric acid, oxalic acid, 8-chlorotheophylline or the like. An example of a nontoxic salt with an acid synthetic resin is that formed with a cross-linked polystyrene polymer containing sulfonic acid groups, such as "Zeo-Karb 225" (manufactured by The Permutit Co., New York).

The following examples further illustrate the present invention and will enable others skilled in the art to understand it more completely. It should be understood, however, that the invention is not limited to the particular examples given below.

EXAMPLE 1

Preparation of 2-(2'-methyl-5'-bromo-anilino)-1,3-diazacyclopentene-(2) by method A A mixture of 6.1 gm. of N-(2-methyl-5-bromo-phenyl)-isothiouronium hydroiodide (0.016 mol), 1.6 cc. of ethylenediamine and 20 cc. of methanol was refluxed for 16 hours. Thereafter, the methanol and the unreacted excess ethylenediamine were evaporated in vacuo, the residue was taken up in a small amount of methanol, and the methanolic solution was made alkaline with aqueous 50 percent potassium hydroxide, whereby an oily precipitate separated out. The reaction mixture was cooled with ice, whereby the oily substance crystallized; the crystalline product was separated by vacuum filtration, washed with water and petroleum ether, and dried. 2.5 gm. of raw reaction product were obtained. The raw product was recrystallized from a mixture of benzene and petroleum ether (boiling point range 40°–80° C.), yielding 1.2 gm. (29.6 percent of theory) of a crystalline substance having a melting point of 145° C., which was identified to be the free base 2-(2'-methyl-5'-bromo-anilino)-1,3-diazacyclopentene-(2) of the formula

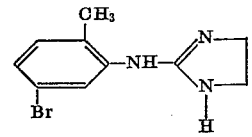

The free base was dissolved in ether, the solution was purified by filtering it through charcoal, and the filtrate was acidified with ethereal hydrochloric acid, 0.9 gm. of the hydrochloride of 2-(2'-methyl-5'-bromo-anilino)-1,3-diazacyclopentene-(2), m.p. 194°–196° C., precipitated out. The product was thin-film-chromatographically pure.

EXAMPLE 2

Using a procedure analogous to that described in example 1, 2-(2'-bromo-5'-methyl-anilino)-1,3-diazacyclopentene-(2) was prepared from N-(2-bromo-5-methyl-phenyl)-isothiouronium hydroiodide and ethylenediamine. Its hydrochloride (yield 2 percent of theory) had a melting point of 238°–240° C.

EXAMPLE 3

Preparation of 2-(2'-methyl-5'-fluoro-anilino)-1,3-diazacyclopentene-(2) by method A A mixture of 13 gm. (0.08 mol) of 2-methyl-5-fluoroaniline hydrochloride, 6.4 gm. of ammonium thiocyanate (105 percent of the stoichiometrically required amount), and 110 cc. of chlorobenzene was heated for 7.5 hours at 95°–100° C. Thereafter, the reaction mixture was allowed to cool, the precipitate which had formed was separated by vacuum filtration, and the filter cake was washed with petroleum ether. The raw reaction product thus obtained was digested with 200 cc. of water, 200 cc. of petroleum ether were added, the mixture was made alkaline with sodium carbonate, and the precipitate formed thereby was separated by vacuum filtration. 7.0 gm. (0.038 mol) of the N-(5-fluoro-2-methylphenyl)-isothiourea, m.p. 119°–122° C., thus obtained were admixed with 40 cc. of methanol and 3.5 cc. of methyl iodide, and the mixture was boiled for 1.5 hours. Thereafter, the reaction mixture was concentrated in vacuo and dried. The residue, N-(2-methyl-5-fluoro-phenyl)-isothiouronium hydroiodide (quantitative yield), was admixed with 40 cc. of methanol and 3.8 cc. of ethylenediamine, and the mixture was refluxed for 18 hours. Thereafter, the methanol was distilled off in vacuo, the residue was dissolved in a small amount of methanol, the solution was made alkaline with aqueous 50 percent potassium hydroxide, and the mixture was cooled and then vigorously stirred with petroleum ether. The precipitate formed thereby was separated by vacuum filtration, washed with water and dried. 5.0 gm. (68 percent of theory) of 2-(2'-methyl-5'-fluoro-anilino)-1,3-diazacyclopentene-(2), m.p. 119°–121° C., of the formula

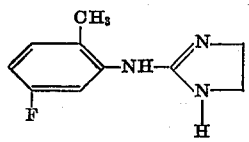

were obtained.

The free base was dissolved in ether, the resulting solution was filtered through activated charcoal, and the filtrate was acidified with ethereal hydrochloric acid. The precipitate formed thereby was isolated and recrystallized from methanol/ether, yielding the hydrochloride of 2-(2'-methyl-5'-fluoro-anilino)-1,3-diazacyclopentene-(2), m.p. 169°–170° C., which was thin-film-chromatographically pure.

EXAMPLE 4

Using a procedure analogous to that described in example 3, 59.5 percent of theory of 2-(2'-fluoro-4'-methyl-anilino)-1,3-diazacyclopentene-(2), m.p. 130°–131° C., of the formula

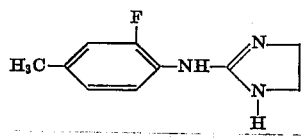

were obtained from N-(2-fluoro-4-methyl-phenyl)-isothiouronium hydroiodide and ethylenediamine.

The nitrate of the base had a melting point of 139° C.

EXAMPLE 5

Using a procedure analogous to that described in example 3, 2-(2'-methyl-4'-fluoro-anilino)-1,3-diazacyclopentene-(2), m.p. 101°–103° C., was prepared from N-(2-methyl-4-fluorophenyl)-isothiouronium hydroiodide and ethylenediamine. The yield was 34.6 percent of theory.

EXAMPLE 6

Preparation of 2-(2'-methyl-3'-bromo-anilino)-1,3-diazacyclopentene-(2) by method A 58.0 gm. of 2-amino-6-nitro-toluene were subjected to the Sandmeyer Reaction with Cu-(I)-Br, yielding 20 gm. (24.4 percent of theory) of 2-bromo-6-nitro-toluene. The reaction product was subjected to catalytic hydrogenation in the presence of Raney nickel at normal pressure until the theoretical amount of hydrogen had been absorbed, yielding 9.2 gm. of 3-bromo-2-methyl-aniline (hydrochloride, m.p. 245° C.).

11.0 gm. (0.05 mol) of 3-bromo-2-methyl-aniline hydrochloride were admixed with 4 gm. of ammonium thiocyanate (105 percent of the stoichiometrically required amount) and 100 cc. of chlorobenzene, and the mixture was heated at 95°–100° C., for about 7 hours. Thereafter, the reaction mixture was allowed to cool, and the precipitate formed thereby was separated by vacuum filtration and washed with water and petroleum ether. The raw reaction product thus obtained was digested with 100 cc. of water, 100 cc. of petroleum ether were added, the solution was made alkaline with sodium carbonate, and the precipitate formed thereby was collected by vacuum filtration.

3.2 gm. (0.013 mol; 26.3 percent of theory) of the N-(3-bromo-2-methyl-phenyl)-isothiourea, m.p. 171° C., thus obtained were admixed with 20 cc. of methanol and 1.2 cc. of methyliodide, and the mixture was boiled for 1.5 hours. Thereafter, the reaction solution was evaporated in vacuo and dried. The residue, N-(3-bromo-2-methyl-phenyl)-isothiouronium hydroiodide (quantitative yield), was admixed with 15 cc. of methanol and 1.3 cc. of ethylenediamine, and the mixture was refluxed for 16 hours. Thereafter, the methanol was distilled off in vacuo, the residue was dissolved in a small amount of methanol, the solution was made alkaline with aqueous 50 percent potassium hydroxide, allowed to cool and then vigorously stirred with petroleum ether. The precipitate formed thereby was collected by vacuum filtration, washed and dried, yielding 1.7 gm. (51.5 percent of theory, based on the amount of isothiouronium salt) of 2-(2'-methyl-3'-bromo-anilino)-1,3-diazacyclopentene-(2), m.p. 105°–107° C., of the formula

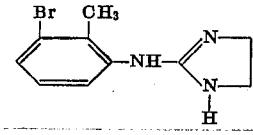

The free base was dissolved in ether, the solution was acidified with ethereal hydrochloric acid, and the precipitate formed thereby was collected and recrystallized from methanol/ether, yielding the hydrochloride of 2-(2'-methyl-3'-bromo-anilino)-1,3-diazacyclopentene-(2), m.p. 210°–211° C., which was thin-film chromatographically pure.

Analysis:

| | | | |
|---|---|---|---|
| Calculated: | C–41.34%; | H–4.51%; | N–14.46% |
| Found: | C–41.34%; | H–4.79%; | N–14.33% |

EXAMPLE 7

Preparation of 2-(2'-chloro-5'-methoxy-anilino)-1,3-diazacyclopentene-(2) by method A 37.5 gm. (0.2 mol) of 4-chloro-3-nitro-anisole were dissolved in a mixture of methanol and tetrahydrofuran, and the solution was hydrogenated under normal conditions of temperature and pressure in the presence of Raney nickel as a catalyst. After the calculated amount of hydrogen had been absorbed (13.4 liters in 3.5 hours) the hydrogenation was discontinued, the catalyst was separated by vacuum filtration, and the colorless filtrate was evaporated to dryness in vacuo. The residue was taken up in ether, the ethereal solution was purified by filtering it through activated charcoal, and then dry gaseous hydrogen chloride was introduced into the filtrate. The precipitate formed thereby was collected by vacuum filtration and dried, yielding 35.5 gm. (0.183 mol; 91.5 percent of theory) of 3-amino-4-chloro-anisole hydrochloride.

The product thus obtained was admixed with 14.6 gm. (105 percent of the stoichiometrically required amount) of ammonium thiocyanate and 250 cc. of chlorobenzene, and the mixture was heated for 6 hours at 95°–100° C. Thereafter, the reaction mixture was allowed to cool, the precipitate which had formed was collected by vacuum filtration, and the filter cake was washed with water and petroleum ether. The raw reaction product was digested with about 300 cc. of water, 300 cc. of petroleum ether were added, the solution was made alkaline with sodium carbonate, and the precipitate was collected by vacuum filtration. 17.0 gm. (42.9 percent of theory) of N-(2-chloro-5-methoxy-phenyl)-isothiourea, m.p. 163°–166° C., were obtained.

The isothiourea compound was admixed with 7.3 cc. of methyliodide and 75 cc. of absolute methanol, and the mixture was boiled for 1.5 hours. Thereafter, the reaction solution was evaporated in vacuo and dried. The residue, N-(2-chloro-5-methoxy-phenyl)-isothiouronium hydroiodide, was admixed with 75 cc. of methanol and 7.85 cc. of ethylenediamine (150 percent of the stoichiometrically required amount), and the mixture was refluxed for 17 hours. Subsequently, the methanol and the excess ethylenediamine were distilled off in vacuo, the residue was dissolved in a small amount of methanol, and the resulting solution was made alkaline with aqueous 50 percent potassium hydroxide, cooled and stirred with petroleum ether. The insoluble matter was separated by vacuum filtration, and the filter cake was washed with water, dried and recrystallized from benzene/petroleum ether. 15.0 gm. (85 percent of theory) of the free base 2-(2'-chloro-5'-methoxy-anilino)-1',3-diazacyclopentene-(2), m.p. 126°–128° C., of the formula

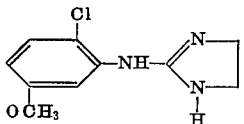

were obtained.

The free base was dissolved in ether, the solution was filtered through activated charcoal, and the filtrate was admixed with concentrated nitric acid until the solution reacted acid to Congo red. The crystalline precipitate formed thereby was collected and recrystallized from methanol/ether, yielding 2-(2'-chloro-5'-methoxy-anilino)-1,3-diazacyclopentene-(2) nitrate, m.p. 177°–178° C., which was thin-film chromatographically pure.

EXAMPLE 8

Using a procedure analogous to that described in example 7, 2-(2'-methoxy-4'-chloro-anilino)-1,3-diazacyclopentene-(2), m.p. 136°–138° C., of the formula

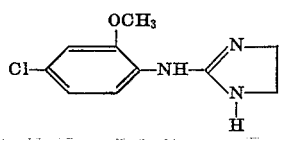

was prepared from N-(2-methoxy-5-chloro-anilino)-isothiouronium hydroiodide and ethylenediamine. The yield was 63.2 percent of theory.

Its hydrochloride had a melting point of 181° C.

EXAMPLE 9

Using a procedure analogous to that described in example 7, 2-(2'-methoxy-5'-chloro-anilino)-1,3-diazacyclopentene-(2), m.p. 145°–147° C., was prepared from N-(2-methoxy-5-chloro-phenyl)-isothiouronium hydroiodide and ethylenediamine. The yield was 44.3 percent of theory.

Its nitrate had a melting point of 140° C.

EXAMPLE 10

Preparation of 2-(2'-bromo-3'-methyl-anilino-1,3-diazacyclopentene-(2) and its hydrochloride by method A A mixture of 25 gm. (0.115 mol) of 2-bromo-3-methyl-aniline hydrochloride (m.p. 211°–212° C.), 9 gm. of ammonium thiocyanate (105 percent of the stoichiometrically required amount) and 150 cc. of chlorobenzene was heated for 15 hours at 95°–100° C. Thereafter, the reaction mixture was allowed to cool, and the precipitate formed thereby was separated by vacuum filtration and washed with water and petroleum ether. The raw N-(2-bromo-3-methyl-phenyl)-isothiourea obtained thereby was digested with 105 cc. of water, 150 cc. of petroleum ether were added, the solution was made alkaline with sodium carbonate, and the precipitate formed thereby, i.e. pure N-(2-bromo-3-methyl-phenyl)-isothiourea, m.p. 234°–238° C., was collected by vacuum filtration.

3.5 gm. of the purified isothiourea compound thus obtained were dissolved in 15 cc. of absolute methanol, 1.5 cc. of methyliodide were added to the solution, and the mixture was boiled for 1.5 hours. Thereafter, the reaction solution was evaporated in vacuo and dried. The residue, N-(2-bromo-3-methyl-phenyl)-isothiouronium hydroiodide (quantitative yield), was dissolved in 15 cc. of methanol, 1.54 cc. of ethylenediamine were added, and the mixture was refluxed for 5 hours. Thereafter, the methanol and the excess ethylenediamine were distilled off in vacuo, and the residue was taken up in a small amount of methanol while warming. The precipitate formed thereby, 2-(2'-bromo-3'-methyl-anilino)-1,3-diazacyclopentene-(2), was collected by vacuum filtration and was converted into its hydrochloride, as described in the previous examples. 0.2 gm. of 2-(2'-bromo-3'-methyl-anilino)-1,3-diazacyclopentene-(2) hydrochloride, m.p. 287°–289° C., were obtained.

EXAMPLE 11

Using a procedure analogous to that described in example 10, 2-(2'-bromo-4'-methyl-anilino)-1,3-diazacyclopentene-(2), m.p. 145°–148° C. (recrystallized from benzene/petroleum ether), was prepared from N-(2-bromo-4-methyl-phenyl)-isothiouronium hydroiodide and ethylenediamine.

Its nitrate had a melting point of 165°–166° C.

The compounds according to the present invention, that is, those embraced by formula I above and their nontoxic, pharmacologically acceptable acid addition salts, have useful pharmacodynamic properties. More particularly, the compounds according to the present invention exhibit hypotensive activities in warm-blooded animals; their advantage over known compounds of similar structure is that the gastric juice secretion-inhibiting side effect is substantially less pronounced than in said related known compounds, as demonstrated by the following comparative tests.

The tests served for the determination of the influence of the test compounds upon the gastric juice output of the stomach of rats pursuant to the method of Shay et al., Gastroenterology, Vol. 5, page 43 (1945). The tests were made on juvenile rats having a body weight of 100 to 150 gm. For at least 2 days prior to the start of the tests the rats were fed only white bread, and during the last 24 hours they received only distilled water in order to empty the stomach. Ten rats per dose were used.

The test compounds were injected subcutaneously at dosage levels of 10, 3, 1, 0.3 and 0.1 mgm./kg. in physiological saline solution. The animals were anesthetized with ether, and then an incision was made in the abdominal wall below the sternum along the linea alba. A ligature was applied around the pylorus. The abdominal muscles and the skin were then successively carefully clamped or sutured. The animal was weighed, and the corresponding dose of the compound to be tested was injected. In each test series two control animals were administered only physiological saline solution.

After 4 hours the rats were killed with ether. The abdominal cavity was opened, the cranial esophagus of the cardia was clamped off, the esophagus and the duodenum were severed from the stomach, the stomach contents were emptied into a graduated cylinder, and the volume was recorded. The stomach was then rinsed twice with distilled water, and the rinses were added to the contents of the graduated cylinder. The contents of the cylinder were then filtered into a small Erlenmeyer flask, the graduated cylinder, the funnel and the filter were rinsed with distilled water, and the rinse water was added to the contents of the flask. About two drops of a mixed indicator consisting of Topfer's composition and phenolphthalein (see Shay et al., ibid, page 46) were added to the contents of the flask, and the solution was titrated against 0.1 N sodium hydroxide. The first end point, indicated by a color change from red to salmon, occurred at pH 2.9 ; the second end point, indicated by a color change from salmon to yellow, occurred at pH 4.0; and the third end point, indicated by a color change from yellow to pink, occurred at pH 8.5. The consumption of sodium hydroxide up to the first end point indicated the amount of free hydrochloric acid in the stomach contents. In order to determine the amount of bonded HCl the median value of the second and third end point was calculated, from which the amount of free HCl was subtracted. The total consumption of NaOH at the third end point was designated as the total acidity.

The $ED_{50}$-values shown in the following table were graphically determined from the individual test dosages and represent the dose of the test compound which produces a 50 percent reduction in the secreted gastric juice volume or a 50 percent decrease in the total acidity, compared to the controls. The smaller the $ED_{50}$, the greater the gastric juice secretion-inhibiting activity of the particular compound. The last column in the table also shows the average of the two $ED_{50}$ values given.

TABLE I

| Compound | Gastric juice volume | Total Acidity | Average |
|---|---|---|---|
| Prior art: Dutch application No. 6,411,516: | | | |
| 2-(2-chloro-6-methyl-anilino)-1,3-diazacyclopentene-(2).HCl | 0.115 | 0.057 | 0.086 |
| 2-(2-chloro-4-methyl-anilino)-1,3-diazacyclopentene-(2).HCl | 0.200 | 0.180 | 0.190 |
| Present invention: | | | |
| 2-(2-fluoro-4-methyl-anilino)-1,3-diazacyclopentene-(2).HCl | >10 | >10 | >10 |
| 2-(2-methyl-5-fluoro-anilino)-1,3-diazacyclopentene-(2).HCl | >10 | >10 | >10 |
| 2-(2-methyl-3-bromo-anilino)-1,3-diazacyclopentene-(2).HCl | 0.850 | 0.390 | 0.620 |
| 2-(2-methyl-4-bromo-anilino)-1,3-diazacyclopentene-(2).HCl | 1.25 | 0.400 | 0.825 |

($ED_{50}$ in mgm./kg.)

The hypotensive activity of the compounds according to the present invention was ascertained by direct measurement of the blood pressure changes in the carotid artery of rabbits after administration of the compounds. All of the compounds of the instant invention were found to be effective hypotensives.

The test method was carried out as follows: Bastard rabbits of both sexes, with a body weight of about 2 to 3 kg. were first weighed and then anesthetized with 0.75 gm./kg. of urethane i.p.

The fur on the neck of the animals were removed, a longitudinal incision 7 to 10 cm. long was made, and the trachea was exposed into which a respiration canula was tied in order to be able to apply artificial respiration to the animal in an emergency. One of the two carotid arteries lying on both sides of the trachea was exposed, and the canula of a manometer was tied into it. The jugular vein was exposed from the fatty tissue, and a canula, provided with a stopcock, was tied into it as a means for intravenous administration of the test compounds.

The body temperature of the animal was continuously measured rectally and, if necessary, was maintained at 37° to 38° C. with a heating pad.

The compound under investigation was injected into the jugular vein at dosages of 0.01, 0.03, 0.1 , 1 and 3 mgm./kg. body weight in increasing as well as decreasing sequence, and the resulting blood pressure changes were recorded. Between injections, a waiting period equal to double the period of effective action was used before the next injection was administered. One compound was tested on each animal, and from 2 to 9 tests per compound were performed.

In addition to the compounds of the present invention, 2-(2'-methyl-3'-chloro-anilino)-1,3-diazacyclopentene-(2), disclosed by Najer et al. in Bull. Soc. Chim. France 1951, 2114 et seq., was tested for its effect upon the blood pressure. The following table shows the results obtained with this compound as well as those obtained with the analogous 3'-bromo-compound according to the present invention.

TABLE II

| Compound | Number of tests | Dosage, mgm./kg. | Blood pressure change, mm. Hg |
|---|---|---|---|
| Prior art: Najer et al. 2-(2'-methyl-3'-chloro-anilino)-1,3-diazacyclopentene-(2) | 5 | 0.01 | 0 |
| | 6 | 0.03 | +4.5±2.6 |
| | 4 | 0.1 | +14.7±5.6 |
| | 4 | 0.3 | +31.5±10.9 |
| | 3 | 1 | +35.6±11.9 |
| | 3 | 3 | +32.3±5.5 |
| Present invention: 2-(2'-methyl-3'-bromo-anilino)-1,3-diazacyclopentene-(2) | 4 | 0.001 | −6.7±2.25 |
| | 4 | 0.003 | −8.5±2.1 |
| | 6 | 0.01 | −12.6±0.79 |
| | 9 | 0.03 | −33±4.71 |
| | 5 | 0.1 | −29.2±4.55 |
| | 2 | 0.3 | −29.5±9.55 |

These results clearly show that the compound according to the present invention has a blood pressure reducing effect, whereas the Najer et al. compound has exactly the opposite effect.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.00083 to 0.84 mgm./kg. body weight. A dosage unit compositions comprising a compound according to the invention as an active ingredient may, if desired, also contain an effective unit dose of another pharmacodynamically active ingredient, such as a saluretic agent, i.e. a compound which promotes the discharge of salt through the urine.

The following examples illustrate a few dosage unit compositions comprising a compound of the instant invention as an active ingredient and represent the best mode contemplated of putting the invention to practical use. The parts are parts by weight unless otherwise specified.

EXAMPLE 12

Tablets

The tablet composition was compounded from the following ingredients:

| | |
|---|---|
| 2-(2'-Methyl-5'-fluoro-anilino)-1,3-diazacyclopentene-(2) hydrochloride | 0.15 parts |
| Lactose | 53.00 parts |
| Corn starch | 31.60 parts |
| Soluble starch | 4.00 parts |
| Magnesium stearate | 1.00 parts |
| Total | 89.75 parts |

The individual ingredients were admixed with each other in a manner customary for manufacture of pharmaceutical tablets, and the mixture was pressed into 89.75 mgm. tablets. Each tablet contained 0.15 mgm. of the diazacyclopentene compound and, when administered perorally to a warm-blooded animal of about 60 kg. body weight in need of such treatment, produced very good hypotensive effects without appreciably reducing the gastric juice secretion rate in the stomach.

EXAMPLE 13

Drop Solution

The solution was compounded from the following ingredients:

| | |
|---|---|
| 2-(2'-Chloro-5'-methoxy-anilino)-1,3-diazacyclopentene-(2) hydrochloride | 0.10 parts |
| p-Hydroxy-benzoic acid methyl ester | 0.07 parts |
| p-Hydroxy-benzoic acid propyl ester | 0.03 parts |
| Demineralized water q.s.ad | 100.00 parts by vol. |

The individual ingredients were dissolved in a sufficient amount of demineralized water, the solution was diluted with additional demineralized water to the desired volume, and the finished solution was filtered. 1 cc. of solution (about 20 drops) contained 2.0 mgm. of the diazacyclopentene compound and, when administered perorally to a warm-blooded animal of about 60 kg. body weight in need of such treatment, produced very good hypotensive effects without appreciably reducing the gastric juice secretion rate in the stomach.

EXAMPLE 14

Hypodermic Solution

The solution was compounded from the following ingredients:

| | |
|---|---|
| 2-(2'-Methyl-3'-bromo-anilino)-1,3-diazacyclopentene-(2) hydrochloride | 0.05 parts |
| Sodium chloride | 18.00 parts |
| Distilled water q.s.ad | 2000.00 parts by vol. |

The individual ingredients were dissolved in a sufficient amount of distilled water, the solution was diluted with additional distilled water to the desired volume, the dilute solution was filtered until free from suspended particles and then filled into 2 cc.-ampules, which were subsequently sterilized and sealed. Each ampule contained 0.05 mgm. of the diazacyclopentene compound, and when the contents thereof were administered by intravenous injection to a warm-blooded animal of about 60 kg. body weight in need of such treatment, very good hypotensive effects were obtained without appreciably reducing the gastric juice secretion rate in the stomach.

EXAMPLE 15

Suppositories

The suppository composition was compounded from the following ingredients:

| | |
|---|---|
| 2-(2'-Bromo-4'-methyl-anilino)-1,3-diazacyclopentene-(2) | 0.3 parts |
| Lactose | 244.2 parts |
| Cocoa butter q.s.ad | 1700.0 parts |

The cocoa butter was melted, the remaining ingredients were stirred into it, the mixture was homogenized, and the finished composition was poured into cooled suppository molds, each holding 1700 mgm. of the composition. Each suppository contained 0.3 mgm. of the diazacyclopentene compound and, when administered by the rectal route to a warm-blooded animal of about 60 kg. body weight in need of such treatment, produced very good hypotensive effects without appreciably reducing the gastric juice secretion rate in the stomach.

Analogous results were obtained when an equal amount of any one of the other compounds embraced by formula I above or a nontoxic acid addition salt thereof was substituted for the particular diazacyclopentene compounds in examples 12 to 15. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the acid of certain specific embodiments thereof, it will be readily apparent to others skilled in the art that the invention is not limited to these particular embodiments, and that various changes and modifications may be made without departing from the spirit of the invention.

We claim:
1. 2-(2'-methyl-3'-bromo-anilino)-1,3-diazacyclopentene-(2) or a nontoxic, pharmacologically acceptable acid addition salt thereof.
2. 2-(2'-chloro-5'-methoxy-anilino)-1,3-diazacyclopentene-(2) or a nontoxic, pharmacologically acceptable acid addition salt thereof.

* * * * *

PO-1050
(5/69)

UNITED STATES PATENT OFFICE
CERTIFICATE OF CORRECTION

Patent No. 3,622,579                    Dated   November 23, 1971

Inventor(s) HELMUT STÄHLE, HERBERT KÖPPE, KARL ZEILE, WOLFGANG HOEFKE and HANS-WOLFGANG SAMTLEBEN It is certified that error appears in the above-identified patent and that said Letters Patent are hereby corrected as shown below:

[72]  Change "Wolfgang Hoeeke" to --Wolfgang Hoefke--.

Col. 6, line 16, insert the closing parenthesis after "anilino".

Col. 9, line 44, "2.0 mgm" should read --1.0 mgm--.

Col. 10, line 44, "acid" should read --aid--.

Signed and sealed this 13th day of June 1972.

(SEAL)
Attest:

EDWARD M. FLETCHER, JR.                      ROBERT GOTTSCHALK
Attesting Officer                            Commissioner of Patents